Dec. 26, 1939.  J. A. ARBOGAST  2,184,330
FISH LURE
Filed April 28, 1938  2 Sheets-Sheet 2
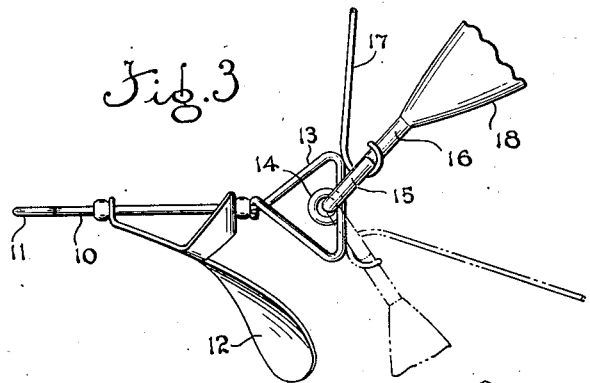
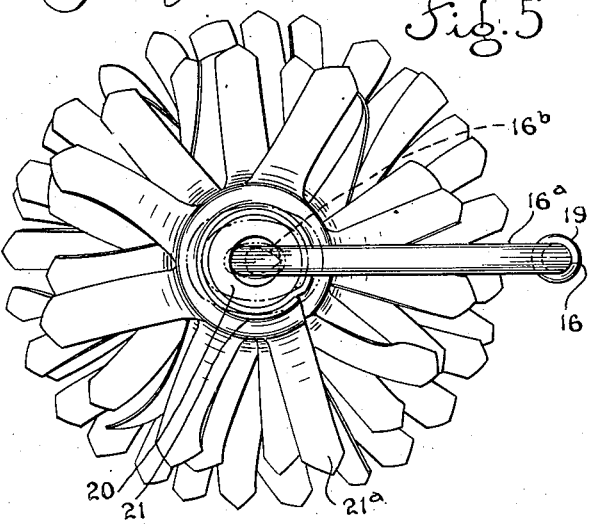
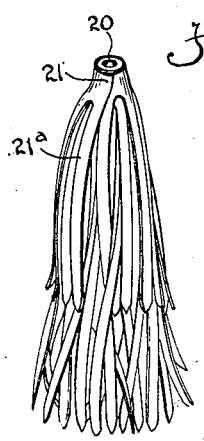
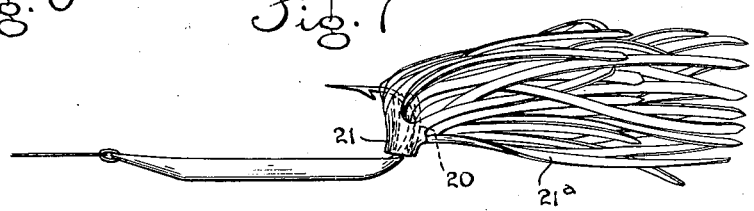
Inventor
Johnson A. Arbogast
J Ralph Barrow,
Attorney Patented Dec. 26, 1939

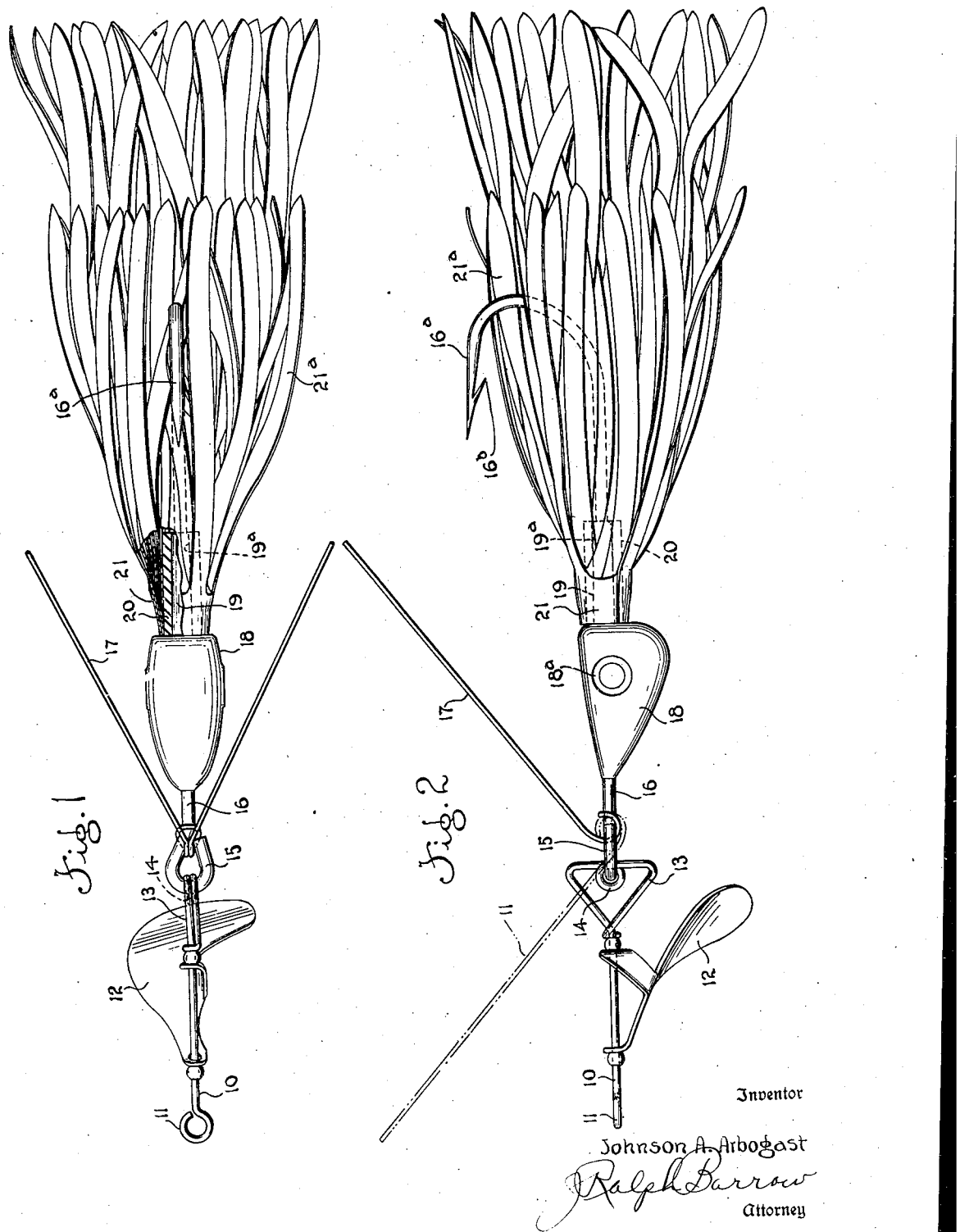

2,184,330

UNITED STATES PATENT OFFICE 2,184,330

FISH LURE

Johnson A. Arbogast, Akron, Ohio

Application April 28, 1938, Serial No. 204,828

1 Claim. (Cl. 43—39)

This invention relates to artificial fish bait.

A purpose of the invention is to provide a simple and inexpensive non-fouling weed guard for baits.

Another purpose of the invention is to provide in an artificial bait an association of weed guard, bait body and buck tail such as to provide a bait natural in appearance, the weed guard looking like feelers on the bait.

The foregoing and other purposes of the invention are attained in the artificial bait illustrated in the accompanying drawings and described below. It is to be understood that the invention is not limited to the specific form thereof shown and described.

The subject matter of the claims in the present application disclosed in applicant's Patent Number 2,111,020, dated March 15, 1938.

Of the accompanying drawings:

Figure 1 is a top plan view partly in section of a bait embodying the invention.

Figure 2 is a side elevation thereof with another extreme position of the non-fouling weed guard shown in dotted lines, its normal position being shown in full lines.

Figure 3 is a fragmentary detail side elevation of the connection between the spinner shaft and bait body, the latter being shown in full lines in the upper extreme position to which it can tilt or cock vertically and the bait body being shown in dotted lines in the lower extreme position to which it can tilt.

Figure 4 is a side elevation partly in section showing how the improved buck tail or fly may be slipped onto a hook.

Figure 5 is an end elevation of the device as shown in Figure 4 and showing also in dotted lines how the improved buck tail may be distorted to be easily withdrawn from a hook over the barb.

Figure 6 is a perspective view of the improved buck tail or fly, and

Figure 7 is a side elevation of another and known type of bait showing the improved buck tail or fly applied thereto.

Referring to Figures 1 to 3 of the drawings, the improved bait may comprise a spinner shaft 10 provided with a loop 11 for attachment of leader or line (not shown) and having thereon a known type of spinner 12. At its rear end the spinner shaft 10 is provided with a triangular loop 13 having its vertex at the rear end of the spinner shaft with diverging sides extending above and below the horizontal and a vertical base in which is formed a loop 14. To the loop 14 there may be connected the loop 15 which may be on the shank of a hook 16. As will be evident from Figure 3 the vertical base of the triangular loop provides stop shoulders limiting vertical cocking or tilting of the bait but allowing free horizontal wobble.

A non-fouling weed guard 17 is provided which preferably comprises a single piece of wire looped at its center over the top of the shank of hook 16 and the portions thereof at each side of the center extending down under the loop 15 and then upwardly through the eye of loop 15, and thereafter diverging outwardly and inclined rearwardly. As will be evident this construction will permit the weed guard to flop forwardly until limited by contact with the forward portion of loop 15 in the dotted line position shown in Figure 2.

The shank of the hook 16 has thereon a bait body 18 so weighted or having its mass so distributed as shown so as to cause the hook to ride through the water with its prong 16ª up. The bait body may be suitably decorated to provide a natural appearance and may, to this end, be decorated with an eye 18ª. Rearwardly on the bait body about shank 16 there extends a reduced body portion 19, preferably substantially cylindrical and preferably having a slightly tapered rear end as at 19ª. This is provided for removably receiving and retaining the improved buck tail on the bait.

The improved buck tail is shown in perspective in Figure 6 and may comprise a short rubber sleeve 20 about which is wrapped and adhesively secured as by rubber cement one or more sheets of rubber preferably having continuous upper portions 21 but so cut beneath these upper portions as to provide separate strands or a fringe 21ª which upon the wrapping of the rubber sheets on the sleeve provide a tassle or buck tail or fly construction. The rubber sleeve 20 may have its outer surface buffed and cemented and the continuous portion 21 of the sheet or sheets 21 may be cemented and wrapped about the sleeve to form an integral whole, self-vulcanizing rubber cement preferably being used. Sheets 21 having strands 21ª of different length and of various colors may be used in combination as illustrated in Figures 1, 2, and 6. The sleeve 20 may be omitted, the rubber sheet or sheets being wrapped upon themselves provide rubber sleeves or the rubber sleeve 20 may be retained and buck tail or fly stock of other material may be secured to the rubber sleeve.

The improved buck tail described may be used with the bait of Figures 1 to 3 by slipping it over the hook as shown in Figure 4 or in the reverse direction depending upon the action desired from the buck tail and the sleeve of the buck tail may be engaged over the end of the body portion 19 and the buck tail forced thereon, the main body of portion 19 being somewhat larger than the aperture through the sleeve of the buck tail whereby the elastic sleeve is expanded and the buck tail is releasably secured by the contractile quality or property of the expanded rubber.

To remove the improved buck tail it may be slid off portion 19 and the shank of hook 16 and to pass it over the barb 16<sup>b</sup> the sleeve of the buck tail may be squeezed to distort its aperture to sufficient width as shown in Figure 5 as to freely pass over the barb 16<sup>b</sup>.

As will be apparent from Figure 7 the improved buck tail may be slipped onto any hook to provide a bait and in this figure it is shown slipped onto the hook of a known type of spoon. This buck tail can be similarly used on the hook 16 of the bait shown in Figures 1 to 3 or on the hooks of similar artificial baits.

Modifications of the invention may be resorted to without departing from the spirit thereof or the scope of the appended claim.

What is claimed is:

In an artificial bait a weed guard construction comprising a shank and loop at the forward end of the bait, a wire looped over the shank at a central portion thereof and having its portions at each side of said central portion extended upwardly through said loop and then upwardly and rearwardly of said bait, the loop of said wire being free of the shank to permit the weed guard to flop forwardly of the bait to avoid fouling of a fishing line with the bait during a cast.

JOHNSON A. ARBOGAST.